(12) United States Patent
Goepfrich et al.

(10) Patent No.: US 6,590,302 B2
(45) Date of Patent: Jul. 8, 2003

(54) METHOD FOR REDUCING NATURAL SYSTEM OSCILLATIONS TO GROUND POTENTIAL IN AN ELECTRICAL DRIVE HAVING A VOLTAGE INTERMEDIATE CIRCUIT

(75) Inventors: Kurt Goepfrich, Erlangen (DE); Sebastian Raith, Erlangen (DE); Bernd Segger, Erlangen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/916,416

(22) Filed: Jul. 27, 2001

(65) Prior Publication Data

US 2002/0093836 A1 Jul. 18, 2002

(30) Foreign Application Priority Data

Nov. 29, 2000 (DE) ........................ 100 59 331

(51) Int. Cl.$^7$ ................................................. H02J 3/24
(52) U.S. Cl. ..................................................... 307/102
(58) Field of Search ............................. 363/35, 39, 44, 363/51; 307/102; 318/251, 530, 536, 537, 629, 632, 700, 702, 705; 322/58; 388/806

(56) References Cited

U.S. PATENT DOCUMENTS

| | | | | |
|---|---|---|---|---|
| 4,434,676 A | * | 3/1984 | Horton | 307/102 |
| 5,111,374 A | * | 5/1992 | Lai et al. | 363/37 |
| 5,559,685 A | * | 9/1996 | Lauw et al. | 363/37 |
| 5,646,498 A | * | 7/1997 | Lipo et al. | 318/800 |
| 5,875,106 A | * | 2/1999 | Tenconi et al. | 307/26 |

FOREIGN PATENT DOCUMENTS

WO    WO 94/07291    * 3/1994

* cited by examiner

Primary Examiner—Shawn Riley
(74) Attorney, Agent, or Firm—Baker Botts LLP

(57) ABSTRACT

A method for reduction of natural system oscillations in an electric motor which is operated using a converter with a voltage intermediate circuit, by periodically decoupling the voltage intermediate circuit ($U_{ZK}$) from the supply mains system (N) at times which are synchronized to triggering equipment for the input converter (E), in particular for as long as current is flowing through the mains system input inductor ($L_K$).

21 Claims, 10 Drawing Sheets

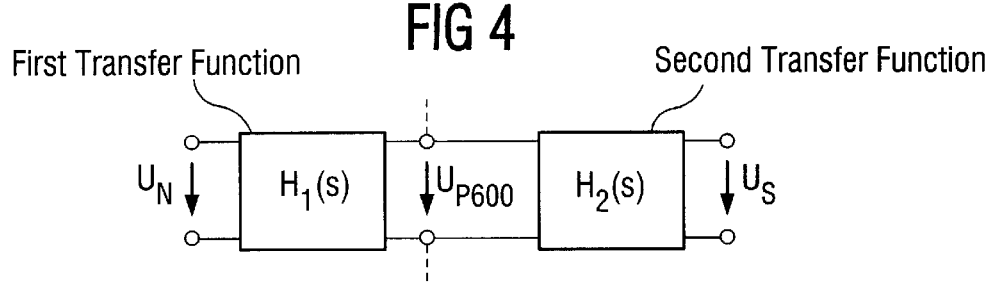
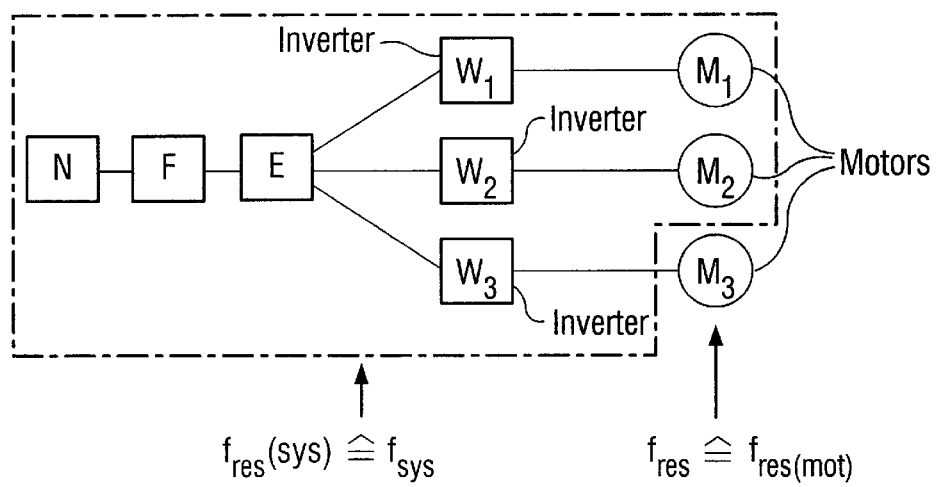
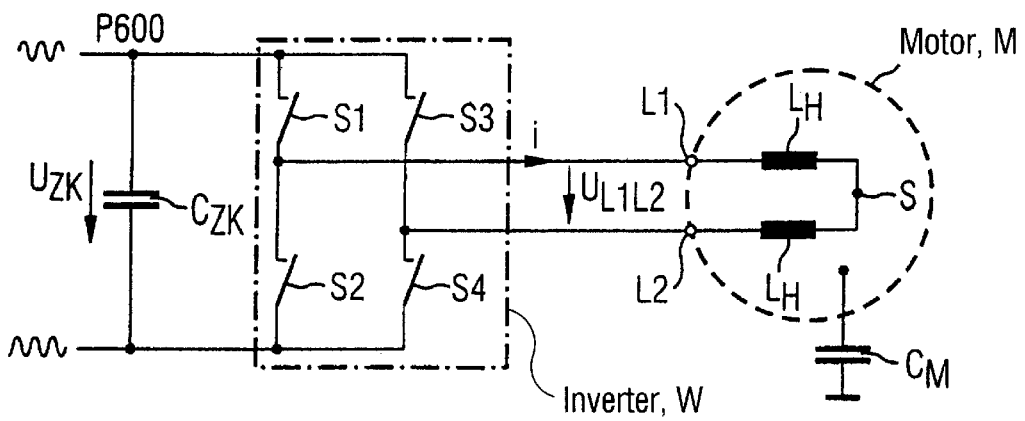

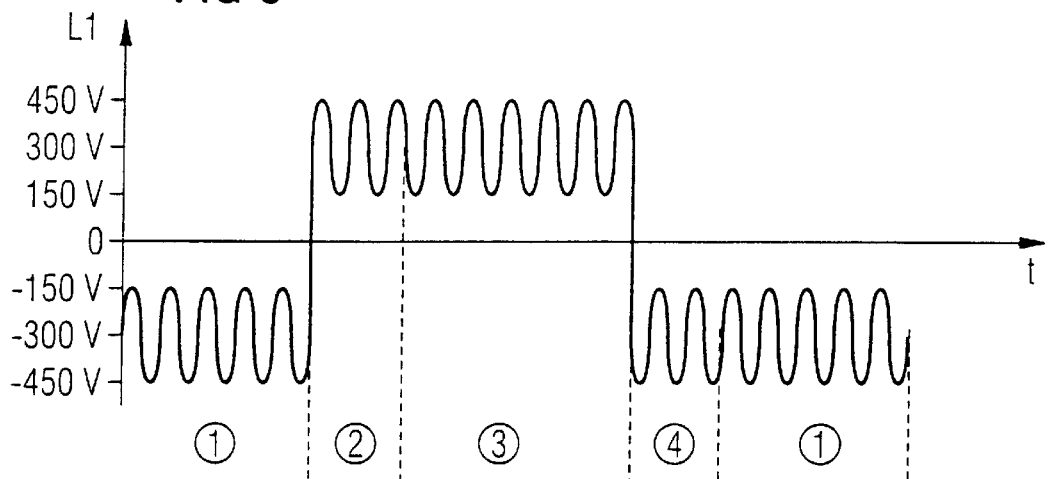
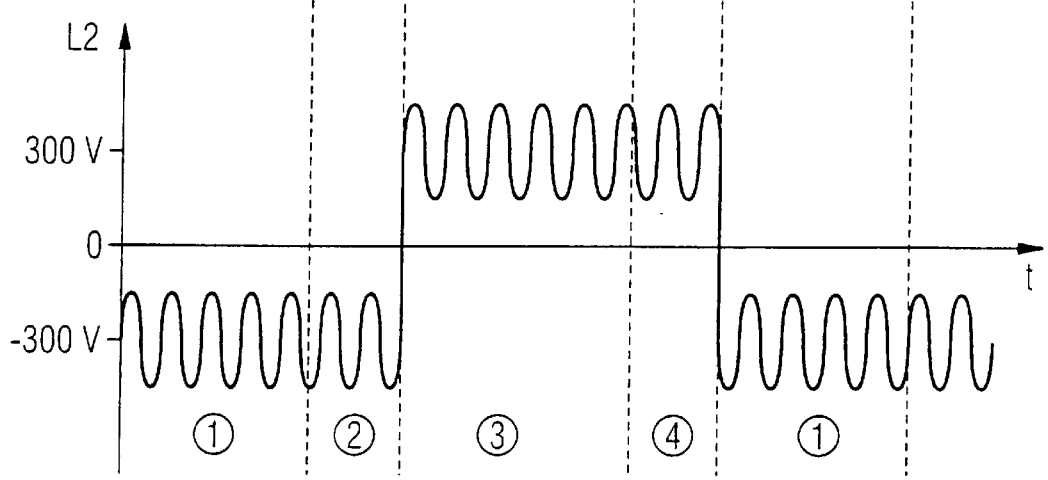

METHOD FOR REDUCING NATURAL SYSTEM OSCILLATIONS TO GROUND POTENTIAL IN AN ELECTRICAL DRIVE HAVING A VOLTAGE INTERMEDIATE CIRCUIT

The present invention relates to a method for reducing natural system oscillations with respect to a ground potential in an electrical drive having a voltage intermediate-circuit converter with a controlled input converter and with an input-side inductance, namely a mains system input inductor using the step-up controller mode, and having an electric motor connected thereto, for example a motor using field coil technology, and to a corresponding electrical drive and intermediate-circuit converter voltage.

BACKGROUND OF THE INVENTION

In present-day converter systems with a intermediate circuit voltage, e.g., in multi-shaft converter systems, system oscillations can be formed which are virtually undamped. This relates primarily to converters having a voltage intermediate circuit and having a controlled feeder in the form of a regulated mains-system-side converter, which also referred to as an input converter.

Converters are principally used for operating electrical machines at a variable supply frequency. An intermediate circuit frequency converter allows an electric motor, for example in a three-phase machine such as a synchronous machine, no longer to be operated directly from the mains system and hence at a fixed rotation speed, since the fixed mains system can be replaced by an electronically produced, variable-frequency and variable-amplitude mains system for supplying the electrical machine.

The two mains systems, first the supply mains system, where the amplitude and frequency are fixed, and second the mains system supplying the electrical machine where the amplitude and frequency are variable, are decoupled via a DC voltage store or a direct current store in the form of an intermediate circuit. Such intermediate-circuit converters in this case essentially have three central assemblies:

- a mains-system-side input converter, which can be designed to be uncontrolled (for example diode bridges), or controlled, in which case energy can be fed back into the mains system only when using a controlled input converter;
- an energy store in the intermediate circuit in the form of a capacitor in a voltage intermediate circuit and an inductor in a current intermediate circuit; and
- an output-side machine converter or inverter for supplying the machine, which generally uses a three-phase bridge circuit having six active current devices which can be turned off, for example IGBT transistors, to convert the DC voltage in a voltage intermediate circuit into a three-phase voltage system.

Such a converter system with a voltage intermediate circuit which is preferably used, inter alia, for main drives and servo drives in machine tools, robots and production machines owing to its very wide frequency and amplitude control range, is shown in the form of an outline sketch in FIG. 1.

The converter UR is connected via a filter F and an energy-storage inductor, whose inductance is $L_K$, to a three-phase mains system N. The converter UR has a feeder E, a voltage intermediate circuit with the energy-storage capacitance $C_{ZK}$, and an output inverter W. FIG. 1 shows a regulated feeder E, which is operated in a controlled manner by means of switching components (for example a three-phase bridge circuit composed of IGBT transistors), as a result of which the arrangement as shown in FIG. 1 experiences a stimulus A1. The inverter W is likewise controlled via further switching components, for example by means of a three-phase bridge circuit having six IGBT transistors. The fact that switching operations also take place in the inverter likewise represents a stimulus A2 to the system. The capacitor $C_{ZK}$ in the voltage intermediate circuit is connected between the positive intermediate circuit rail P600 and the negative intermediate circuit rail M600. The inverter is connected on the output side via a line LT and by means of a protective-ground conductor PE and a shield SM to a motor M, in the form of a three-phase machine.

The fixed-frequency three-phase mains system N feeds the intermediate circuit capacitor $C_{ZK}$ via the filter F and the energy-storage inductor $L_K$ by means of the regulated feeder and via the input converter E, with the input converter E (for example a pulse-controlled converter) operating together with the energy-storage inductor $L_K$ as a step-up controller. Once current has flowed through the energy-storage inductor $L_K$, it is connected to the intermediate circuit and forces the current against the greater voltage into the capacitor $C_{ZK}$. This also allows the intermediate circuit voltage to be kept above the peak value of the mains voltage.

This combination thus effectively represents a DC voltage source. The inverter W uses this DC voltage to form a three-phase voltage system in which, in contrast to the sinusoidal voltage from a three-phase generator, the output voltage does not have an ideal sinusoidal oscillation profile, but also has harmonics since it is produced electronically via a bridge circuit.

In addition to the above-described elements in such an arrangement, it is necessary to remember that parasitic capacitances occur which assist the formation of system oscillations in such a converter system. For example, in addition to the filter F with a discharge capacitance $C_F$, the input converter E, the inverter W and the motor M all have discharge capacitances $C_E$, $C_W$ and $C_M$ to ground. Furthermore, the line LT has a capacitance $C_{PE}$ to the protective-ground conductor PE, and a capacitance $C_{SM}$ to the grounded shield SM.

It has now been found that these system oscillations are stimulated in a particularly pronounced manner in the feeder E. Depending on the control method chosen for the feeder, two or three phases of the mains system N are in this case short-circuited, in order to cause current to flow through the energy-storage inductor $L_K$. If all three phases U, V, W are short-circuited, then either the positive P600 or the negative intermediate circuit rail M600 is rigidly locked to the star point of the supply mains system (generally close to ground potential depending on the zero system component). If two phases of the mains system N are short-circuited, then the relevant intermediate circuit rails P600 and M600 are rigidly locked to an inductive voltage divider from the two mains system phases.

Depending on the mains voltage situation, this voltage is close to ground potential (approximately 50–60 V). Since the intermediate circuit capacitance $C_{ZK}$ is generally large (continuous voltage profile), the other intermediate circuit rail 600 V is lower or higher, and may thus also drag down the remaining mains system phase. In both situations, the intermediate circuit is particularly severely deflected from its "natural", balanced rest position (±300 V with respect to ground), thus representing a particularly powerful stimulus to system oscillation.

With regard to the production of undesirable system oscillations, the frequency band which is relevant for the application area of less than 50 to 100 kHz allows a resonant frequency to be calculated with concentrated elements. In this case, the discharge capacitances $C_F$ to ground in the filter F are generally so large that they do not govern the frequency. In this case, it can be assumed that there is a dominant stimulus to oscillations before the described capacitances, and the filter discharge capacitance $C_F$ can be ignored.

The resonant frequency $f_{res}(sys)$ of this system, which is referred to by $f_{sys}$ in the following text, thus becomes:

$$f_{sys} = \frac{1}{2\pi\sqrt{L_\Sigma \cdot C_\Sigma}} \quad (1)$$

where $$L_E = L_K + L_F \quad (2)$$

where $L_K$ represents the dominant component and $L_F$ the unbalanced inductive elements in the filter (for example current-compensated inductors) which act on the converter side, and $$C_E = C_F + C_W + C_{PE} + C_{SM} + C_M \quad (3)$$

This expression is shown schematically in FIG. 2. In this case, $L_E$ and $C_E$ form a passive circuit, which is stimulated by a stimulus A and starts to oscillate at its natural resonant frequency $f_{sys}$. As a consequence, the potentials on the intermediate circuit rails P600 and M600 are modulated, in addition to the shift with an amplitude of 600 V, for example, resulting from the operating procedure, with an additional undesirable oscillation at an amplitude of up to several hundred volts.

In electric motors M in general, but particularly when they are designed using field coil technology (for example torque motors), a frequency response with pronounced resonant peaks with respect to ground potential can occur if they are stimulated in the common mode with respect to ground at all the motor terminals, for example by the undesirable system oscillations described above.

These resonance points can be explained by an unbalanced equivalent circuit formed by a lattice network circuit K with parasitic elements (inductances L and discharge capacitances C) in the motor winding, as is shown schematically in FIG. 3. In this case, the winding section for one phase U of a three-phase motor M having the three phases U, V, W is shown by way of example, and in this case the winding sections are electrically connected to one another at the motor star point S. The input voltages of the three-phase current generated by the inverter W are applied to the outer terminals of the respective winding sections opposite the star point S.

This relates in particular to motors using field coil technology, in which individual lattice four-pole networks of the lattice network K are macroscopically plausible by virtue of the design, and essentially correspond to an individual field coil. With field coil technology, the magnetic cores, which are composed of electrical laminations, have teeth which act as pole cores, onto which prefabricated coils are placed and wired-up as appropriate. As can be seen in FIG. 3, the individual inductances L are electrically connected in series, with each field coil having a capacitive coupling to the pole core (electrical lamination), on which the coil is mounted. These respective capacitances are shown as discharge capacitances C to ground, and are formed by the magnetic core.

However, the above-described phenomenon can also be explained for motors having a different configuration (for example using what is referred to as a wild winding) by a model of a lattice network K, since this represents an equivalent circuit with identical four-pole networks in the form of LC tuned circuits, with the elements simulating the frequency response. In this case, the peak occurs in the region of the star point S, which is normally not deliberately subjected to voltage loads. If the system oscillation of a converter system is near the motor's natural frequency, then the insulation to ground, in particular at the star point S, can be overloaded, leading to premature failure of the motor M, since the resonance results in considerably greater voltages at the motor star point than those which can occur at the motor terminals.

This condition applies in principle to all voltage levels (low-voltage, medium-voltage and high-voltage systems), but particularly when the step-up controller principle (with an energy-storage inductor LK) is being used on the converter side UR, and a frequency response with pronounced resonant peaks with respect to ground potential occurs on the other side in the motor M, for example in motors with a particularly low motor natural frequency. In this case, the intrinsic damping in the motor, resulting from any eddy current losses, remagnetization losses etc, is particularly low.

The object of the present invention is thus to avoid such natural system oscillations in a converter system.

SUMMARY OF THE INVENTION

Accordingly, the object of the present invention is achieved by a method for reducing natural system oscillations with respect to the ground potential in an electrical drive having a voltage intermediate-circuit converter with a controlled input converter and with an input-side inductance, in particular a mains system input inductor, and having an electric motor connected thereto, and preferably one using field coil technology. In such an application, the voltage intermediate circuit is periodically disconnected from the supply mains system at times which are synchronized to triggering equipment for the input converter. Furthermore, if the controlled input converter having the input-side mains system input inductor operates on the step-controller principle, it is recommended that the voltage intermediate circuit be disconnected from the supply mains system periodically at times which are synchronized to triggering equipment for the input converter. Where the input converter is controlled in the square-wave current mode, then it has been found to be advantageous to always disconnect the voltage intermediate circuit from the input converter as long as current is flowing in the input-side inductance.

If, on the other hand, the input converter is controlled using a sine-weighted pulse pattern, then the voltage intermediate circuit is preferably always disconnected from the input converter for as long as it is switching zero vectors. If the input converter is operating with general space-vector modulation, then the voltage intermediate circuit is advantageously always disconnected from the input converter for as long as it is switching zero vectors.

When the square-wave current mode or sine-wave current mode is being used to drive the input converter, the decoupling of the voltage intermediate circuit according to the invention allows the voltage intermediate circuit to be balanced with respect to ground potential via Y capacitors.

Switching power semiconductor switches, in particular IGBT transistors, have been found to be advantageous for this periodic disconnection of the voltage input circuit from the input converter. Particularly good results can be achieved if two phases of the voltage intermediate circuit are disconnected from the input converter. This is achieved, for example, by connecting an IGBT transistor in each supply line, between the input converter output and the two connections of the intermediate circuit capacitor.

Furthermore, the aforementioned object of the present invention is achieved by an electrical drive having a voltage intermediate-circuit converter with a controlled input converter and with an input-side inductance, in particular a mains system input inductor, and having an electrical motor connected thereto, in particular a motor using field pole technology. This is achieved by at least one switching means for periodic disconnection of the voltage intermediate circuit from the supply mains system. This has been found to be particularly advantageous for a voltage intermediate-circuit converter with a controlled input converter and with an input-side mains system input inductor for operation on the step-up controller principle. It has also been found to be advantageous if each switching means can be synchronized to triggering equipment for the input converter for periodic disconnection of the voltage intermediate circuit from the input converter, for example if each switching means is used for synchronized decoupling of the voltage intermediate circuit from the input converter during suitable times for current to flow to the mains system input inductor.

According to one advantageous refinement of circuit arrangements according to the invention, IGBT transistors with respective freewheeling diodes are arranged in the supply lines between the input inductor and the voltage intermediate circuit as switching means for periodic disconnection of the voltage intermediate circuit from the input converter, with the diodes being arranged back-to-back in parallel.

As long as pronounced motor resonance points are well above any possible system oscillations of the converter system, the risk of resonant peaks at the motor star point is low. However, this situation changes the closer such resonant frequencies in the frequency response of the motor with respect to ground potential come into the area of such system oscillations by the converter system. This is due primarily to the physical size of the motor itself. The size of a motor is governed by the slot area which, for its part, acts on the capacitance $C_M$ of the motor with respect to ground potential in such a way that the discharge capacitance increases with the size of the slot area. As the discharge capacitance $C_M$ of the motor increases, the pronounced resonant frequency $f_{res}$ of the amplitude/frequency response of the motor with respect to ground potential falls, and thus comes closer to the area of undesirable system natural frequencies $f_{sys}$ of the converter system. Hence, as the geometric size of the motor increases, for example the physical length or the diameter, pronounced resonant frequencies come closer to this critical region, and the problem of resonant peaks increases.

The present invention actively and effectively counters this by providing a means to prevent the formation of such undesirable natural system oscillations $f_{sys}$. The invention thus results in a considerable amount of smoothing of the converter system with respect to ground potential PE, since the potential of the intermediate circuit is no longer severely and periodically dragged down to ground.

BRIEF DESCRIPTION OF THE DRAWINGS

Further details and advantages of the present invention will be evident from the following description of a preferred exemplary embodiment taken in conjunction with the figures, wherein elements having the same functionality are denoted by the same reference symbols and in which:

FIG. 4 shows an outline sketch in order to provide a system-theoretical description of the effective path of the voltages with respect to ground potential from the mains system to the motor star point;

FIG. 5 shows a schematic block diagram of a topology for a converter system;

FIG. 6 shows an outline sketch of a balanced drive for the motor from the voltage intermediate circuit on the basis of two phases L1 and L2;

FIG. 8 shows a timing diagram of the voltage profile of the phase L1 with respect to ground;

FIG. 9 shows a corresponding timing diagram of the voltage profile of the phase L2 with respect to ground;

DETAILED DESCRIPTION OF THE INVENTION

Figure 1:
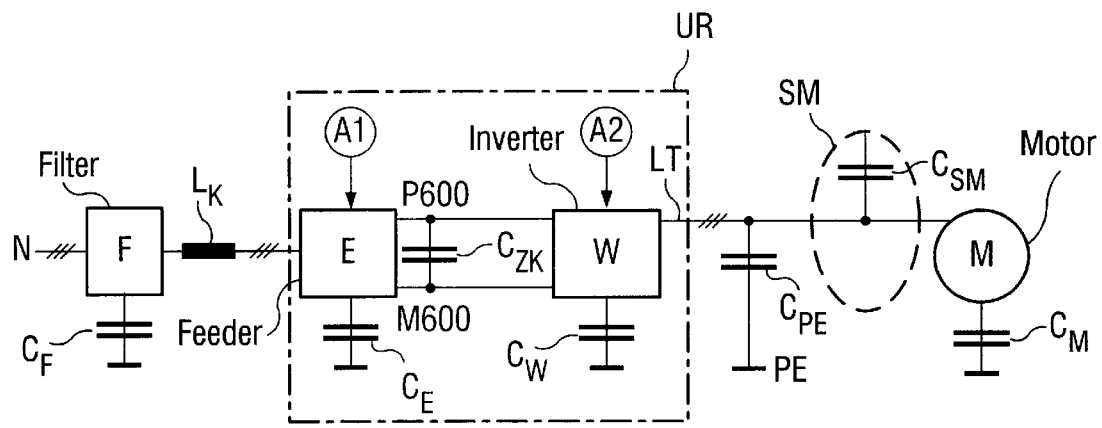
FIG. 1 shows a block diagram of a converter system with a three-phase motor using a converter with a voltage intermediate circuit and a controlled input converter, and a mains system input inductor in the step-up controller mode.
Figure 2:
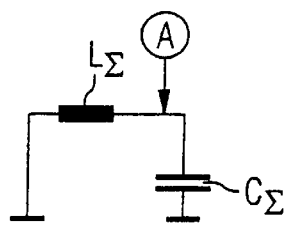
FIG. 2 shows an equivalent circuit of the passive circuit formed by the arrangement of a converter system as shown in FIG. 1, with regard to system oscillations.
Figure 3:
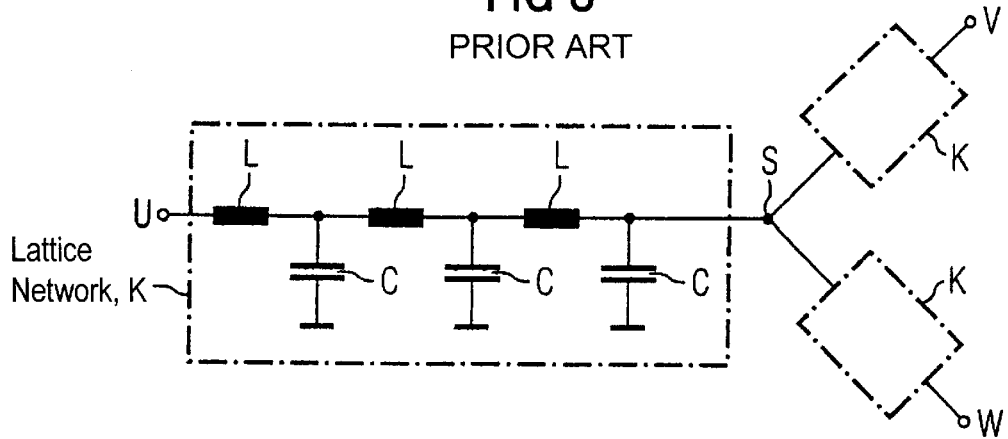
FIG. 3 shows an outline sketch of a lattice network structure formed in a motor.

FIG. 1 to FIG. 3 have already been explained, initially, in order to allow better understanding of the problems which the present invention seeks to eliminate. It should be mentioned, however that identification of the problems of system oscillations in a converter system as shown in FIG. 1, particularly with a mains system input inductor $L_K$ in the step-up controller mode and in conjunction with a motor with a lattice network structure K, and their cause, are not known from the prior art. This identification of the problems is thus regarded as a considerable advance resulting from the present invention.

The system theory of a converter system as shown in FIG. 1 will be assessed initially with regard to an effective path from the mains system to the motor star point. To this end, FIG. 4 shows a corresponding outline sketch with the input-side mains system voltage $U_N$ with respect to earth, which is converted by the converter system with a first transfer function $H_1(s)$ to the voltage $U_{P600}$ on the positive intermediate circuit rail. In the motor, this voltage $U_{P600}$ is converted via a second transfer function $H_2(s)$ to a voltage US which is present between the motor star point S and ground.

It must be remembered that, in practice, a number of motors are often operated from one converter system, by feeding a number of inverters $W_1$ to $W_3$ with connected motors $M_1$ to $M_3$ from the intermediate circuit voltage UZK. The illustration in FIG. 5 shows an example of one topology for such a converter system. The input converter E is fed via the filter arrangement F from the mains system N, and feeds a number of inverters $W_1$ to $W_3$ with connected motors $M_1$ to $M_3$ from the intermediate circuit voltage $U_{ZK}$.

With regard to system oscillations between the respective inverters $W_1$ to $W_3$ at the connected motors $M_1$ to $M_3$, it must be remembered that the converter system comprising N, F, E, $W_1$ to $W_3$ has a system natural frequency $f_{sys}$, which describes the resonant frequency $f_{res}$(sys) of the system. In contrast, the motors $M_1$ to $M_3$ themselves have their own resonant frequency $f_{res}$, which corresponds to the natural frequency $f_{res}$(mot) of the respective motor. The system-theoretical analysis shown in FIG. 4 is therefore separate for the respective motor. Because of this the converter system with the transfer function $H_1(s)$ comprises, for a topology as shown in FIG. 5, the filter F, the inductance $L_K$, the input converter E, all the inverters W, all the other motors M and all the lines LT.

In such a converter system, or in a converter system in general, a system oscillation can be formed, as described initially, which is stimulated in particular by the pulsing of a feeder E and, to a lesser extent, also by the pulsing of the inverters W in the shaft modules. This pulsing results in periodic charge reversal in the parasitic capacitances, as has already been explained with reference to FIG. 1.

If the mains system voltage $U_N$ is regarded as an input variable, then this is mapped by the transfer function $H_1(s)$ onto the output variable $U_{P600}$ (if one considers the positive intermediate circuit rail P600). Except for 600 V DC components, this voltage $U_{P600}$ is applied in the common mode to the motor terminals, thus corresponding to an unbalanced system or zero system.

In theory, the motor line LT can be associated both with $H_1(s)$ and with $H_2(s)$. Qualitatively, the statements apply to both situations. Here, it is assumed that the motor line LT is associated with $H_1(s)$. In the frequency band under consideration, the line LT can be regarded as being electrically short.

As already mentioned, the passive circuit formed in this way and shown in FIG. 2 has a natural resonant frequency $f_{res}$(sys) or $f_{sys}$ at which this system starts to oscillate. As a consequence, the potentials on the intermediate circuit rails P600 and M600 are modulated with an additional, undesirable oscillation with an amplitude of up to several hundred volts in addition to the shifts with an amplitude of 600 V, for example, by virtue of operation.

This means that the output voltages from the inverter W with respect to ground are no longer square waves, as is the case between two phases U, V, W, but the output voltages represent sections of system oscillations on the intermediate circuit rails, P600 and M600.

This can best be illustrated if one considers the outline sketch, shown in FIG. 6, of a balanced drive for the motor M from the voltage intermediate circuit $C_{ZK}$ on the basis of two phases L1 and L2. The illustration shows the intermediate circuit with the intermediate circuit capacitance $C_{ZK}$ and the intermediate circuit rails P600 and M600, from which, via a simplified inverter with a bridge circuit and having the switches S1 to S4, a voltage $U_{L1L2}$ or a current i is produced for feeding two winding sections L1 and L2 (which are connected at the motor star point S) of the motor M, and each having inductances $L_H$. The motor has the discharge capacitance $C_M$ to ground potential.

Figure 7:
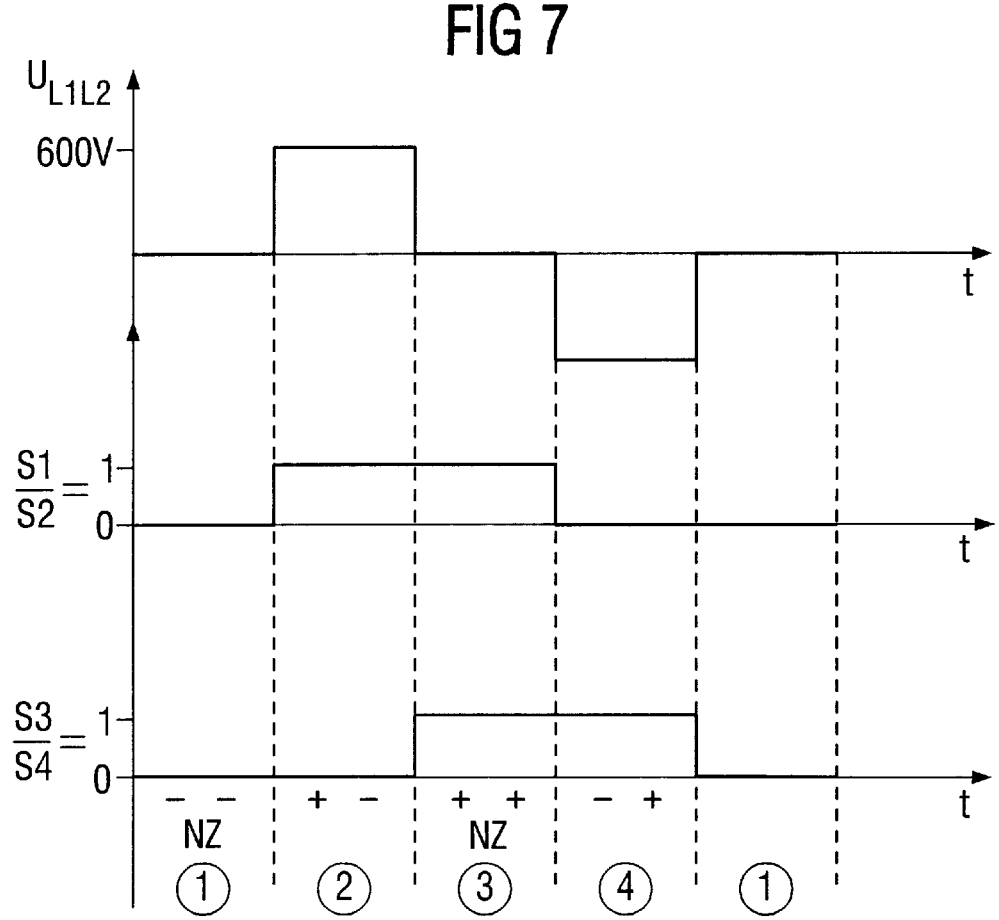
FIG. 7 shows a timing diagram of the voltage profile between these two phases L1 and L2, in comparison to the switching states of the inverter W.

The illustration in FIG. 7 shows the profile of the voltage $U_{L1L2}$ between the phases L1 and L2 plotted against time t compared with the respective switching states of the switches S1 to S4 in the bridge of the inverter W, likewise plotted with respect to time $t_0$. The switches S1 and S2 represent the first bridge arm, and the switches S3 and S4 represent the second bridge arm. In this case, switches in one phase are always inverted with respect to one another since, otherwise, the intermediate circuit would be short-circuited.

The four states 1, 2, 3 and 4 are assumed in order to illustrate the switching states of the two bridge arms S1/S2 and S3/S4. In state 1, S1=0, S2=1 and S3=0, S4=1 with the state '−−' for the phases L1 and L2. Thus, in this situation, so-called zero vectors NZ are switched, and the voltage $U_{L1L2}$ between the phases L1 and L2 is zero.

In state 2, S1=1, S2=0 and S3=0, S4=1. This results in the state '+−' with a voltage $U_{L1L2}$ of 600 V between the phases L1 and L2.

In state 3, S1=1, S2=0 and S3=1, S4=0. This results in the state '++', so that so-called zero vectors NZ are switched once again, and the voltage $U_{L1L2}$ between the phases L1 and L2 is zero.

Finally, in state 4, S1=0, S2=1 and S3=1, S4=0. This results in the state '−+' with a voltage $U_{L1L2}$ of −600 V between the phases L1 and L2. A new state 1 then starts, and so on.

FIG. 8 likewise shows the profile of the voltage in the phase L1 with respect to ground plotted against time t, i.e., in an unbalanced manner, for the states 1 to 4. In this case, the phenomenon described above can be seen, as a result of which the voltage profile is not an ideal square waveform, since the undesirable system oscillations of the converter system from FIG. 1 and FIG. 4 are modulated onto it with, for example, an amplitude of approximately 150 V. The same applies in some circumstances to a constant amplitude shift for the unbalanced voltage profile of the phase L2 with respect to ground, which is shown in FIG. 9. It can be seen that both phases L1 and L2, and hence the intermediate circuit rails P600 and M600, oscillate in time with one another. This means that there is always a 'parallel' shift, that is to say there is no phase shift.

Figure 10:
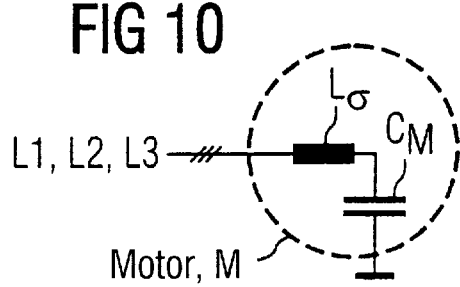
FIG. 10 shows an outline sketch of an unbalanced drive for the motor from the voltage intermediate circuit as a common-mode system for consideration of one phase to ground.

This clearly shows that the problem of possible resonant peaks is essentially caused by unbalanced currents i. For this reason, it is worthwhile analyzing the arrangement as a common-mode system, as is shown by the details in FIG. 10 in the form of an outline sketch of an unbalanced drive from a motor M from the voltage intermediate circuit $C_{ZK}$. It is thus assumed in this case that all the motor phases U, V, W or L1 to L3 formn an inductance $L_O$, which is caused by the motor winding and is terminated by the discharge capacitance $C_M$ to ground.

If one considers the two phases L1 and L2, but now jointly in the common-mode system (referred to in the following text as L1&&L2), then this results in the voltage profile with respect to ground shown in FIG. 11. No common-mode signal can be sketched from the "parallel" shift, which can be seen in FIG. 6 and FIG. 7, of the individual phases L1, L2 in the common-mode system for L1____L2 in the states 2 and 4 since the phases L1 and L2 are at different potentials here (the DC voltage separation is 600 volts). Since only two phases are considered, this is, on average and in common-mode terms, 0 volts. In the other states 1 and 3, the voltage profile L1&&L2 corresponds to that of L1 in FIG. 8 and to that of L2 in FIG. 9.

Figure 11:
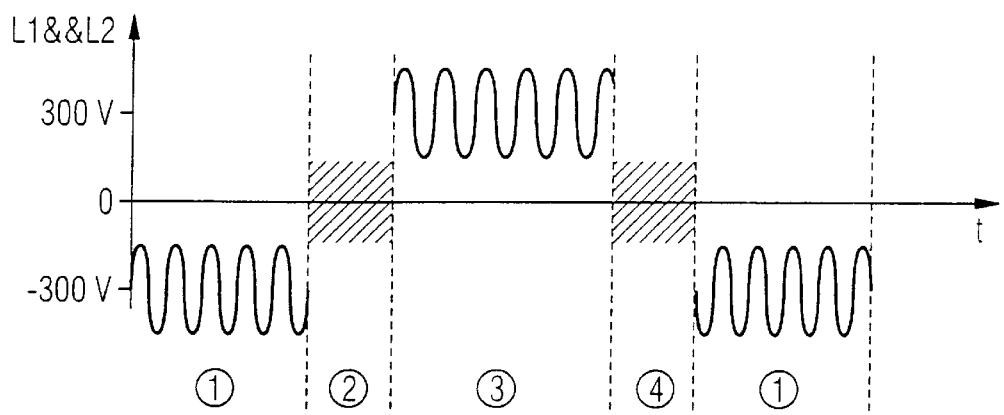
FIG. 11 shows a timing diagram of the unbalanced voltage profile of the phases L1 and L2 with respect to ground.

The voltage profile of L1&&L2 shown in FIG. 11 in the common-mode system can in this case be separated into a fundamental GW and a harmonic OW. These are shown separately in FIG. 12 and FIG. 13.

Figure 12:
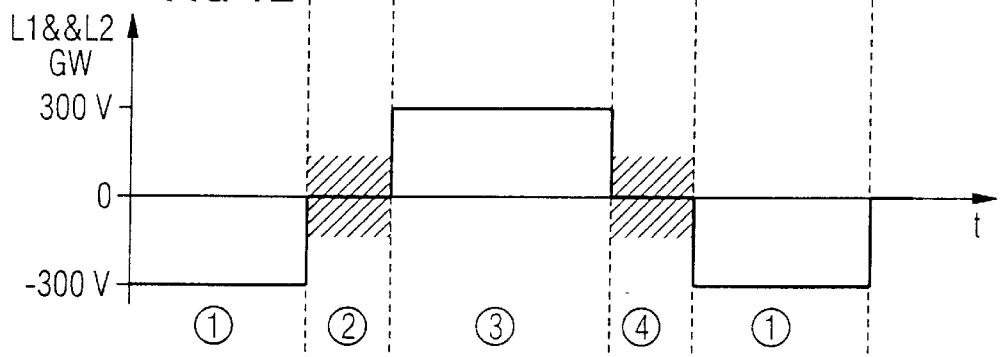
FIG. 12 shows a corresponding timing diagram of the DC component of the unbalanced voltage profile of the phases L1 and L2 with respect to ground.
Figure 13:
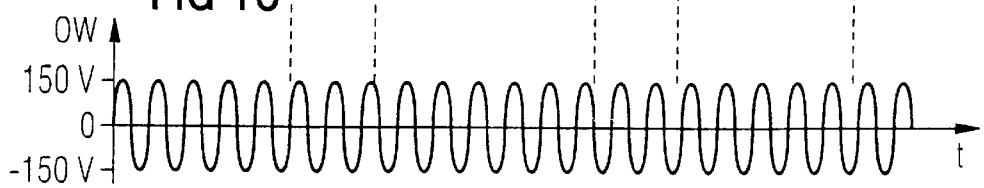
FIG. 13 shows a corresponding timing diagram of the AC component of the unbalanced voltage profile of the phases L1 and L2 with respect to ground.

The voltage profile of the fundamental GW can be seen from the illustration in FIG. 12. In this case, it is clear that this describes the desired square-wave switching state with −300 V in state 1, 0 V in states 2 and 4 owing to the "parallel" shift and +300 V in state 3. The harmonic OW, shown in FIG. 13 of the voltage profile L1&&L2, describes an essentially constant sinusoidal profile with an amplitude of, for example, 150 V.

The harmonic or system oscillation is thus applied to the motor M in all states 1 to 4, as a result of which this phase-ground tuned circuit, as shown in FIG. 2, in the motor M is continuously stimulated. If this system oscillation is now in the vicinity of a motor natural frequency, or the motor M has a pronounced resonance in the vicinity of the frequency of the system oscillation, it is possible for undesirable resonance peaks to occur. A "maximum" oscillation of this phase-ground tuned circuit is generally prevented only by the breakdown of the hannonic as a result of switching from one state to the next.

With regard to the system-theoretical analysis of the problems shown in FIG. 4, discussed above, the amplitude of such a system oscillation $f_{sys}$ in this case depends essentially on two factors. The first factor is the intrinsic damping in the system, which is inversely proportional to the Q-factor of the tuned circuit, with the damping increasing as the frequency rises. The second factor is the stimulus, i.e., the nature of the feeder (for example diode feeder or regulated feeder), and the magnitude of the intermediate circuit voltage $U_{ZK}$.

Particularly pronounced natural system oscillations can thus be observed in converter systems which have a large number of shaft modules W and motors M, and long motor lines LT. The frequency range of the natural system oscillations $f_{sys}$ in this case generally extends from approximately 10 kHz for large converter systems to more than 50 kHz for relatively small converter systems.

Amplitude and frequency thus depend on the configuration and the physical extent of the system, for example:

the nature of the feeder E (regulated or unregulated);

the number of shafts or motors M which are operated from a converter system UR; and the length of the power lines LT.

It should also be stated at this point that converter systems with a voltage intermediate circuit may exhibit natural oscillations on the intermediate circuit rails P600, M600 to ground. These are particularly pronounced in multi-shaft systems and in the case of regulated mains system feeders in the input converter E, particularly in the step-up controller mode. The motor M in an unbalanced system is thus stimulated virtually at a single frequency irrespective of the pulse patterns of the individual phases U, V, W or L1 to L3. This stimulus is mapped by the transfer function $H_2(s)$ onto the output side, namely the voltage Us at the star point S with respect to ground.

Figure 14:
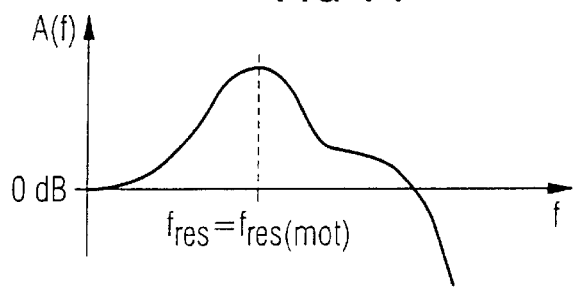
FIG. 14 shows an amplitude/frequency response of any given motor with respect to ground, in order to illustrate the transfer function $H_2(s)$.

All electric motors M, irrespective of the type, have a transfer function $H_2(s)$ with respect to ground, the amplitude/frequency response A(f) of which is as shown in FIG. 14. This has a pronounced resonant frequency $f_{res}$(mot) or $f_{res}$. The transfer function $H_2(s)$ can in this case be described as:

$$H_2(s) = U_{P600}/U_S.$$

The frequency of the pronounced resonant peak of the motor depends on the inductive and capacitive elements in the motor with respect to ground and is thus defined by:

$$f_{res} \propto \frac{1}{\sqrt{L_M \cdot C_M}},$$

where $L_M=f(L_{PE})$ is the effective inductance and $C_M=f(C_{PE})$ is the effective capacitance of the motor M with respect to the ground potential PE, or in the zero system, respectively. The precise functions in this case depend on the respective test method and the equivalent circuits being used.

If there are a number of star points S, then identical tuned circuits are connected in parallel. The capacitance per tuned circuit is in this case defined by:

$$\tilde{C} \propto \frac{C_M}{Anz_S}.$$

The inductance depends on the number of coils connected in series, with there being a number of star points S, particularly when using field coil technology. Since the individual coils may be regarded as being magnetically decoupled from one another, it can furthermore be stated that:

$$\tilde{L} \propto \frac{n_{1S}}{Anz_S},$$

where $n_{1S}$ is the number of coil assemblies for one star point S, and $Anz_S$ is the number of star points S.

It can thus be stated, for motors of the same size, but with identical coil groups connected differently, that:

$$f_{res} \propto \frac{1}{\sqrt{\frac{1}{Anz_S} \cdot \frac{1}{Anz_S}}} \propto Anz_S.$$

The influence of the motor size on the resonant frequency $f_{res}$ can be estimated as follows:

$$C = \frac{\varepsilon \cdot A}{d}$$

where $A \propto$ slot area $\propto D \cdot LG$; where D is the diameter and LG the length of the motor.

Thus, with regard to the influence of the motor size, assuming that the other characteristics are constant the following is applicable:

$$f_{res} \propto \frac{1}{\sqrt{\text{slot area}}} \propto \frac{1}{\sqrt{D \cdot LG}}.$$

Figure 15:
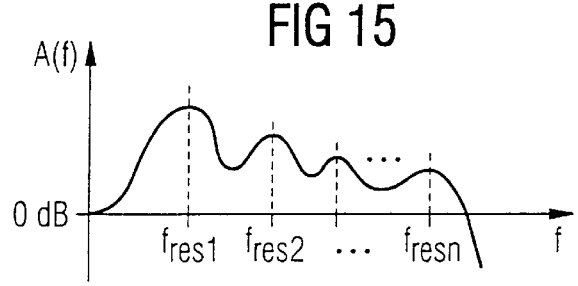
FIG. 15 shows an amplitude/frequency response for a motor with respect to ground, ignoring the intrinsic damping, which increases as the frequency rises, in order to illustrate the transfer function $H_2(s)$.

When the natural damping is ignored, which damping increases as the frequency f rises (resulting from eddy current losses, remagnetization etc. and particularly if the motor M is regarded as a lattice network K, as appears to be macroscopically plausible particularly in the case of motors using field coil technology since the coil groups are connected in series), this results in the amplitude/frequency response A(f) shown in FIG. 15. This has a number of local maxima which describe a number of resonant frequencies $f_{res\ 1}$ to $f_{res\ n}$, with the first resonant peak $f_{res\ 1}$, which is at the lowest frequency, being dominant and thus representing the governing or pronounced resonant frequency $f_{res}$.

There are thus frequencies at which considerably higher voltages occur at the motor star point S than at the input terminals of the motor M and which, for example, are greater by a factor of 3 to 4. In this case, it can be confirmed that the resonant peak becomes higher as the $f_{res}$ becomes lower. Geometrically large torque motors are thus particularly at risk, in which resonant points $f_{res}$ can be formed particularly easily over the slot area and over a number of star points S and which are in the vicinity of or are precisely at the frequency $f_{sys}$ of the natural system oscillations.

Figure 16:
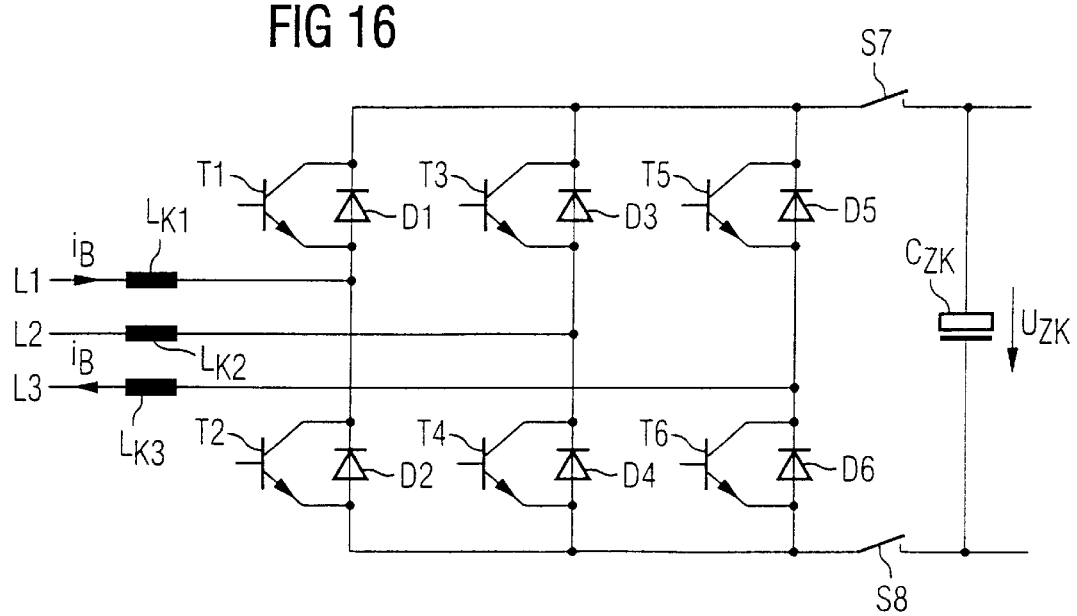
FIG. 16 shows a block diagram of a controlled input converter with means system input inductors and a voltage intermediate circuit which can be decoupled.

FIG. 16 shows a block diagram of a regulated input converter with mains system input inductors $L_{K1}$ to $L_{K3}$ for the three phases L1 to L3. The drive is provided by respective IGBT transistors T1 to T6 each having an associated freewheeling diode D1 to D6 as active current devices which are arranged in a three-phase bridge circuit. Respective switches S7 and S8 are provided in the positive and negative intermediate circuit rails P600 and M600, respectively, in order to decouple the voltage intermediate circuit by means of the intermediate circuit capacitance $C_{ZK}$.

With regard to the nature of the way in which the active current devices T1 to T6 are controlled, a distinction can be drawn between a number of feed control principles. Firstly, what is referred to as square-wave current control is a classical step-up controller principle in which two, and only two phases of L1 to L3 of the mains system N are short-circuited, and the remaining third phase is disconnected. After passing current to the respective energy-storage inductors $L_{K1}$ to $L_{K3}$, this is connected to the intermediate circuit and forces the current against the higher voltage into the capacitor $C_{ZK}$.

In order to reduce the mains system reactions resulting from the current wave form, control methods are used in which sinusoidal currents are taken from the mains system N. In this case, the current is either regulated in one, and only one, phase using the mains system voltage in order to ensure that only real power is drawn from the mains system, or a specific phase shift is set between the current and voltage, in order to influence the wattless component interchanged with the mains system.

What is referred to as sinusoidal current control comprises three-phase current control of the mains system phases L1 to L3. This may be regarded as the converse of an output inverter W. The mains voltage system N in this case corresponds to the emf of a synchronous motor with a constant rotation frequency of 50 Hz. The mains system currents govern the "torque" which, in the end, governs the direction of the power flow and its magnitude. Sinusoidal current control is the analog implementation of simple space-vector modulation. In contrast to the situation in the square-wave current mode, where unweighted pulses or blocks are generated with phase shifts of 120°, such pulses or blocks are sine-weighted in the sinusoidal current mode.

Figure 17:
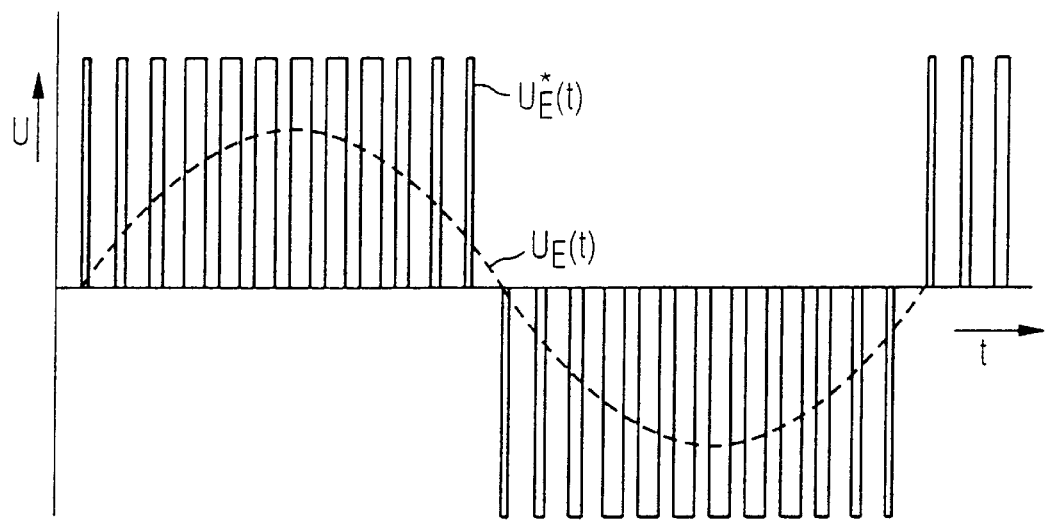
FIG. 17 shows an example of a timing diagram of the sine-weighted pulses produced by the input converter.

The profile resulting from this is shown in the illustration in FIG. 17, which shows a timing diagram of the sine-weighted pulses produced by the input converter in simplified form, based on an AC circuit. The fundamental of the input converter input voltage $U_E(t)$ is compared with the corresponding sine-weighted pulse pattern $U_E^*(t)$. In this case, it can be seen that, as the amplitude of $U_E(t)$ increases, the width of the generated pulses likewise increases, and vice versa.

Figure 18:
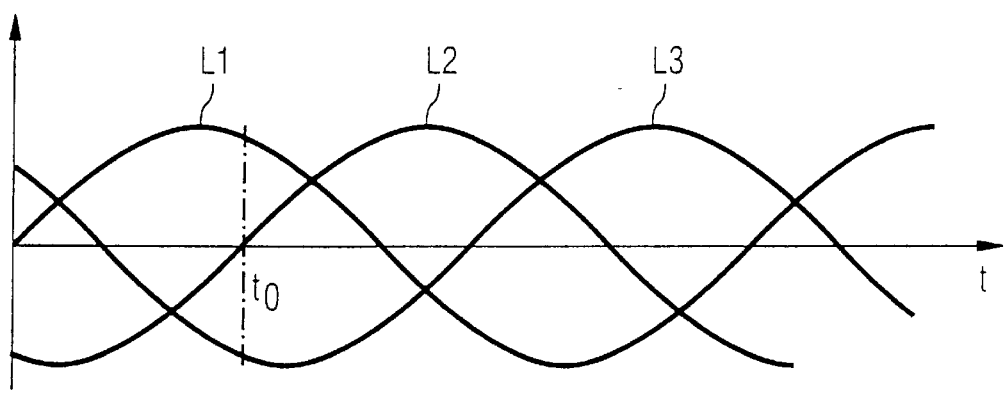
FIG. 18 shows a timing diagram of the input-side phase voltages of the input converter with respect to ground potential $P_E$ for square-wave current control.

The problem addressed by the invention as explained above is thus a fundamental characteristic of regulated feeders which operate in accordance with the described principles. To assist further in the understanding of the principle of the present invention, it will now be described in more detail with reference to square-wave current control. To this end, FIG. 18 shows the sinusoidal voltage profile with respect to ground potential PE on the individual phases L1 to L3 and hence as applied to the input side of the input converter E, with each phase being phase-shifted through ±120° with respect to the two others. A time t0 is marked by way of example as the starting time for the explanation.

Figure 19:
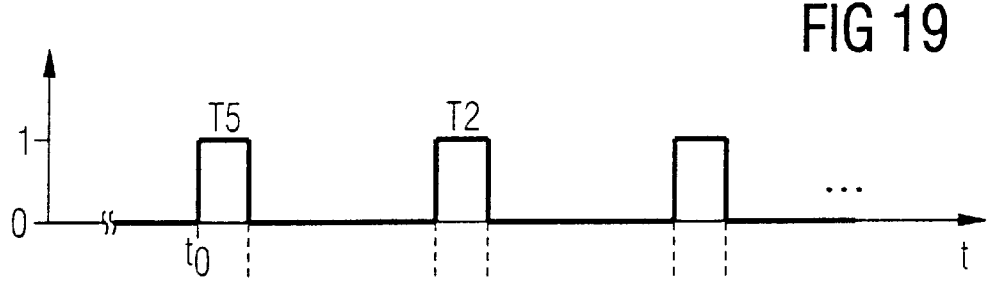
FIG. 19 shows the switching states associated with FIG. 18 for the active current devices in the input converter.
Figure 20:
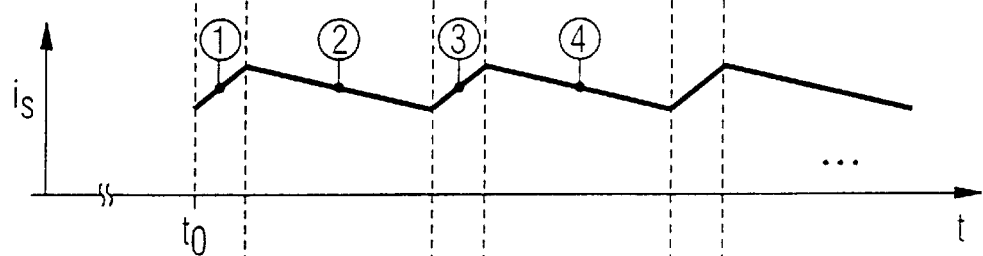
FIG. 20 shows the current resulting from this in the mains system input inductor.
Figure 21:
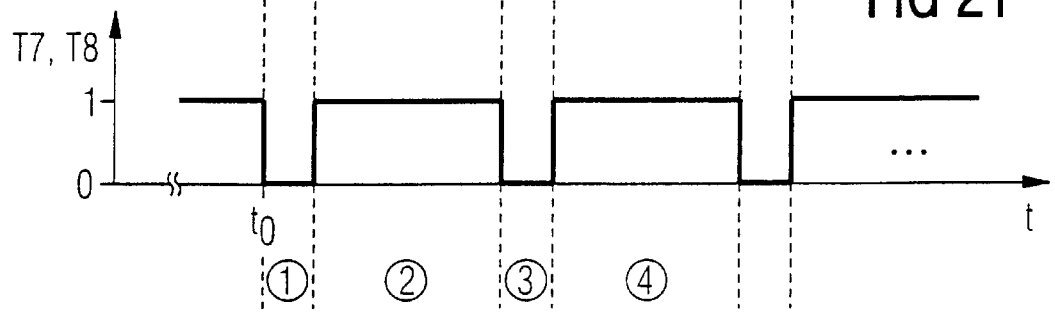
FIG. 21 shows the associated timing diagram for synchronized decoupling of the voltage intermediate circuit, according to the invention, for square-wave current control.

Based on this starting time t0, FIGS. 19 to 21 show, in small detail in comparison to FIG. 18, the first two switching states of the transistors T2, T5 in the input converter E (FIG. 19); the profile of the current $i_B$ resulting from this in the respective mains system input inductors $L_{K1}$, and $L_{K3}$, in this case for $L_{K1}$ (FIG. 20); and the associated timing diagram for the switches S7, S8 for synchronized decoupling of the voltage intermediate circuit according to the invention, for square-wave current control (FIG. 21).

As can be seen from FIG. 18, the phase L2 has a zero crossing at the time t0, and no current therefore flows. In contrast, a current $i_B$ flows in the phase L1 from the mains system N through the inductor $L_{K1}$, to the input converter E, as can also be seen from the positive voltage profile of L1 at the time t0. The current $i_B$ flows in a corresponding manner back through inductor $L_{K3}$ in the phase L3, as can also be seen from the negative voltage value in the phase L3 at the time t0.

To allow this current to flow, the transistor T5 is switched on in this switching phase 1, as can be seen from the PWM diagram shown in FIG. 19. In a corresponding way, the current $i_B$ thus flows via the freewheeling diode D1 and the transistor T5 back into the mains system N. As shown in FIG. 20, current flows through the mains system input inductor $L_{K1}$ in this switching phase 1, with the inductor being charged with magnetic field energy and $i_B$ increases. The switches S7 and S8 are open in this phase 1, and the voltage intermediate circuit is thus decoupled.

In the switching phase 2, the transistor T5 is closed once again, and the intermediate circuit is connected once again via the two switches S7, S8. The current $i_B$ now flows via the freewheeling diode D1, via the positive intermediate circuit rail P600 and the closed switch S7, via the intermediate circuit capacitance $C_{ZK}$, via the negative intermediate circuit rail M600 and the closed switch S8, and via the freewheeling diode D6. The mains system input inductor $L_{K1}$ is thus discharged by forcing current into the intermediate circuit capacitance $C_{ZK}$, which is thus charged. This corresponds to the principle of the step-up controller mode.

In the following switching phase 3, the transistor T2 is now closed in order to charge the mains system input inductor $L_{K1}$ once again and thus, according to the invention, the intermediate circuit is once again decoupled by opening the switches S7 and S8. In this constellation, the current $i_B$ flows via the transistor T2 and the freewheeling diode D6.

This is followed by the switching phase 4, in which the mains system input inductor $L_{K1}$ is discharged once again, and forces the current $i_B$ into the intermediate circuit capacitor $C_{ZK}$. To do this, the transistor T2 is switched off and the intermediate circuit is connected via S7 and S8. The current $i_B$ then flows via the freewheeling diode D1, the switch S7, the intermediate circuit capacitance $C_{ZK}$, the switch S8 and the freewheeling diode D6.

This principle of synchronization by triggering equipment for the transistors T1 to T6 and the switching states of the switches S7, S8 for connecting/decoupling the intermediate circuit can now be continued for the further switching phases, which are known to those skilled in the art, for square-wave current control. Whenever current is flowing through the energy-storage inductors $L_{K1}$ to $L_{K3}$, the intermediate circuit is disconnected from the supply mains system, in this case from the input converter E itself. The third phase of the input converter E (this is the phase L2 in the example) is in this case disconnected.

Figure 22:
FIG. 22 shows a timing diagram of the switching states of the first pair of active current devices T1, T2 in the input converter for sinusoidal current control.
Figure 23:
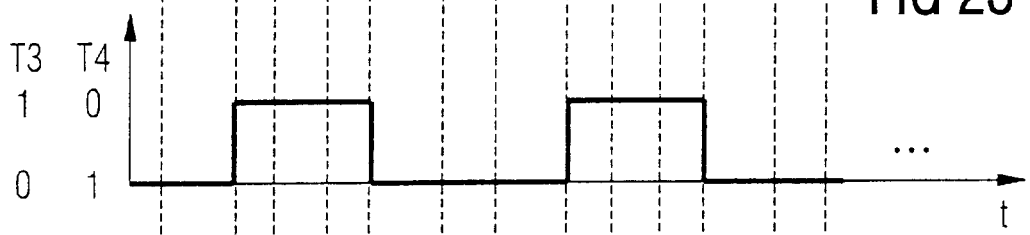
FIG. 23 shows a corresponding timing diagram of the switching states for the second pair of active current devices T3, T4 in the input converter for sinusoidal current control.
Figure 24:
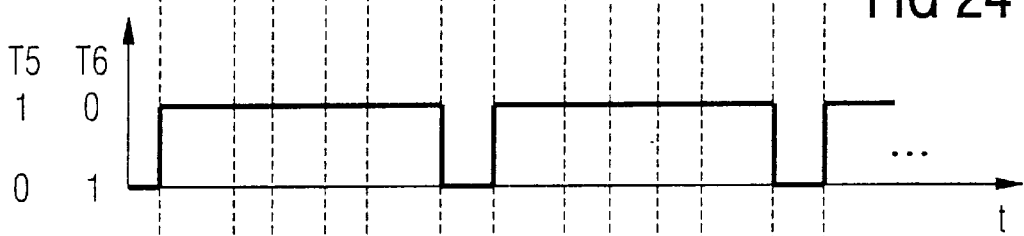
FIG. 24 shows a corresponding timing diagram of the switching states of the third pair of active current devices T5, T6 in the input converter for sinusoidal current control.

FIGS. 22 to 25 illustrate the principle of the invention for operation using sinusoidal current control. The switching states of the respective pairs of active current devices in the three-phase bridge circuit are shown on the basis of the three-phase current control, which is used in this case, in the input converter E. For this purpose, FIG. 22 shows the pair of transistors T1 and T2, FIG. 23 shows the pair of transistors T3 and T4, and FIG. 24 shows the pair of transistors T5 and T6. As in FIG. 19, the illustrations in each case show ON/OFF states of the pairs of transistors, since it is never possible for both transistors to be closed at the same time, since this would cause a short-circuit in the intermediate circuit. The switching states of the pairs of transistors T1, T2; T3, T4 and T5, T6 are in this case always inverted with respect to one another. ON or "1" thus means that one transistor in a pair of transistors is switched on, while OFF or "0" means that the other remains open.

Figure 25:
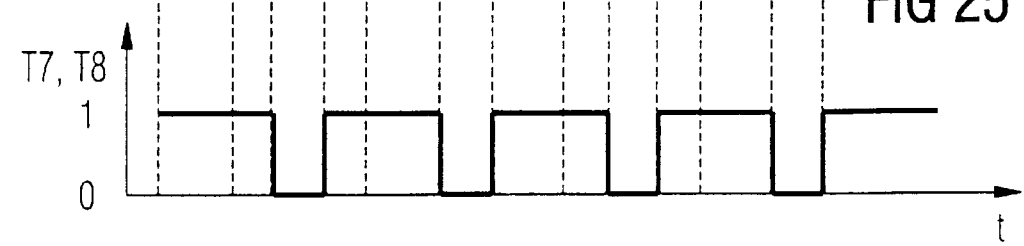
FIG. 25 shows the associated timing diagram for synchronized decoupling of the voltage intermediate circuit, according to the invention, for sinusoidal current control.

The switching states shown in FIGS. 22 to 24 for the three-phase bridge arrangement in the input converter E as shown in FIG. 16 can now be used to produce the sine-weighted pulse patterns, which are illustrated in FIG. 17. FIG. 25 illustrates the synchronized switching states associated with these for the switches S7, S8 for connecting/decoupling the intermediate circuit. ON or "1" in this case means that both switches S7 and S8 are closed. It can be seen from this that, whenever the input converter E is switching the zero vector, that is to say all the pairs of transistors are switched on +++ or are open ---, the intermediate circuit is decoupled since the switches S7, S8 are open. Such synchronization can be carried out in a simple manner by coupling the drive signals for the triggering equipment for the transistors T1 to T6 via, for example, logic AND-gates. This sinusoidal current control represents a simple form of space-vector modulation. It can likewise be said for general space-vector modulation that the intermediate circuit is decoupled while the input converter E is switching zero vectors. In this case, the times during which the intermediate circuit remains disconnected from the mains system can be lengthened, but at the expense of the waveform of the mains system currents, which are then no longer sinusoidal but have an enlarged harmonic component.

Figure 26:
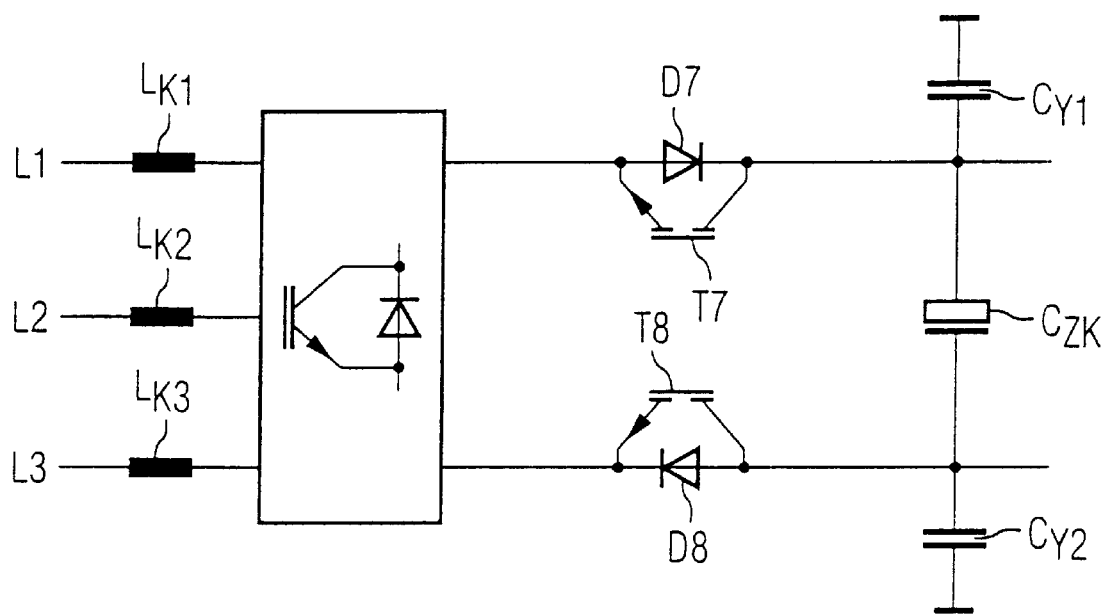
FIG. 26 shows a block diagram of one advantageous implementation of an input converter according to the invention.

FIG. 26 shows a further advantageous embodiment of an input converter according to the invention. In this case, in addition to the mains system input inductors $L_{K1}$ to $L_{K3}$ and the input converter E, IGBT transistors T7 for the positive intermediate circuit rail P600 and T8 for the negative intermediate circuit rail M600 are provided as the switches for decoupling the intermediate circuit. Each transistor T7 and T8 preferably has a freewheeling diode D7 and D8, with the transistors being arranged in such a manner that the two diodes D7 and D8 are connected back-to-back in parallel.

If, by way of example, one visualizes the switching phase 1 shown in FIGS. 19 to 21, then it becomes clear that the positive intermediate circuit rail P600 is at a voltage of approximately 0 volts between the diode D1 and the switched-on transistor T5 (that is to say upstream of a switch T7 together with D7), because the phase L1 is at approximately +300 volts, and the phase L3 is at approximately −300 volts. In contrast, there is a potential of approximately +300 volts on the side of the intermediate circuit capacitance $C_{ZK}$ for P600. This means that no current can flow via the freewheeling diode D7 in the switching phase 1, since this freewheeling diode D7 is reverse-biased. The same logic applies in a corresponding manner to the other switching phases.

Owing to the decoupling of the intermediate circuit with respect to ground potential, it is also possible to balance the intermediate circuit with regard to P600 and M600 via Y capacitors CY1, CY2 shown in FIG. 26, as in the case of unregulated diode feeders.

In theory, it is also feasible to decouple the intermediate circuit via only one switch S7 or S8, T7, D7 or T8, D8, although better results are achieved with two-phase decoupling, as shown in FIGS. 16 and 26. The invention allows major smoothing of the converter system with respect to ground as shown in FIG. 1 since, in the case of square-wave current control, the potential of the intermediate circuit is no longer so severely dragged down to ground periodically and, in the case of sinusoidal current control or space-vector modulation, the largest stimuli during the switching of zero vectors are avoided, so that only the small number of poor, minor stimuli then remain.

What is claimed is:

1. A method for reducing natural system oscillations with respect to an electrical drive having a ground potential, said drive connected to an electric motor, said drive having supply mains systems, a voltage intermediate-circuit converter with a controlled input converter with an input-side inductance comprising disconnecting the voltage intermediate circuit periodically from the supply mains system at times which are synchronized to triggering equipment for the input converter.

2. The method according to claim 1, wherein the input converter is controlled in the square-wave current mode, and the voltage intermediate circuit is disconnected from the input converter while current is flowing through the input-side inductance.

3. The method according to claim 1 wherein the input-side inductance is a mains system input inductor.

4. The method according to claim 1, wherein the electric motor utilizes field coil technology.

5. A method for operating a voltage intermediate-circuit converter for reducing natural system oscillations with respect to an electrical drive having a ground potential, said drive having supply mains systems and being connected to an electric motor, said converter having a controlled input converter and an input-side mains system input inductor, comprising periodically disconnecting the voltage intermediate circuit from the supply mains system at times which are synchronized to triggering equipment for the input converter.

6. The method according to claim 5 is operated under step-controller principles.

7. The method according to claim 5, wherein the input converter is controlled in the square-wave current mode, and the voltage intermediate circuit is disconnected from the input converter as long as current is flowing through the mains system input inductor.

8. The method according to claim 1 wherein the input converter is controlled by a sine-weighted pulse pattern, and the voltage intermediate circuit is disconnected from the input converter for as long as it is switching a zero vector.

9. The method according to claim 1, wherein the input converter is controlled by general space-vector modulation, and the voltage intermediate circuit is disconnected from the input converter for as long as it is switching a zero vector.

10. The method according to claim 2, wherein the voltage intermediate circuit is balanced with respect to ground potential via capacitors.

11. The method according to claim 1, wherein the voltage intermediate circuit is disconnected from the input converter by means of switching power semiconductor switches.

12. The method according to claim 11 wherein the switches are IGBT transistors.

13. The method according to claim 1, wherein two of the voltage intermediate circuit has two phases which are disconnected from the input converter.

14. An electric drive apparatus comprising a voltage intermediate-circuit converter with a controlled input converter and with an input-side inductance, said drive apparatus connected to an electric motor and having a ground potential, further comprising at least one switching means for periodic disconnection of the voltage intermediate circuit from a supply mains in order to reduce natural system oscillations with respect to the electric drive.

15. The electric drive according to claim 14 wherein the input-side inductance is a mains system input inductor.

16. The electric drive according to claim 14, wherein the motor utilizes field coil technology.

17. A voltage intermediate-circuit connector apparatus comprising a controlled input converter and an input-side mains system input inductor, further comprising at least one switching means for periodic disconnection of the voltage intermediate circuit from a supply mains system in order to reduce natural system oscillations in an electrical drive having a ground potential.

18. The converter according to claim 17 which is operated on step-up controller principles.

19. The apparatus according to claim 14, wherein each switching means can be synchronized to triggering equipment for the input converter for periodic disconnection of the voltage intermediate circuit from the input converter.

20. The apparatus according to claim 15, wherein each switching means is used for synchronized decoupling of the voltage intermediate circuit from the input converter during suitable times for current to flow to the mains system input inductor.

21. The apparatus according to claim 15, wherein IGBT transistors sand respective freewheeling diodes are arranged in supply lines between the input inductor and the voltage intermediate circuit as switching means for periodic disconnection of the voltage intermediate circuit from the input converter, and further wherein, the diodes are arranged back-to-back in parallel.

* * * * *

UNITED STATES PATENT AND TRADEMARK OFFICE
CERTIFICATE OF CORRECTION

PATENT NO. : 6,590,302 B2
DATED : July 8, 2003
INVENTOR(S) : Goepfrich et al.

It is certified that error appears in the above-identified patent and that said Letters Patent is hereby corrected as shown below:

Column 3,
Line 18, "$L_E=L_K+L_F$" should read -- $L_\Sigma=L_K+L_F$ --
Line 24, "$C_E=C_E+C_W+C_{PE}+C_{SM}+C_M$" should read -- $C_\Sigma=C_E+C_W+C_{PE}+C_{SM}+C_M$ --
Line 27, "$L_E$ and $C_E$" should read -- $L_\Sigma$ and $C_\Sigma$ --

Column 6,
Line 50, "means" should read -- mains --
Line 56, "$P_E$" should read -- PE --

Column 7,
Line 37, "US" should read -- $U_S$ --

Column 9,
Line 23, "formn" should read -- form --
Line 60, "hannonic" shoud read -- harmonic --

Column 11,
Line 21, "A α slot area α D·LG;" should read -- A ∝ slot area ∝ D·LG; --

Column 12,
Line 34, "$U_E^*(t)$," should read -- $U_E^*(t)$, --

Lines 60, 64 and 67, "t0," should read -- $t_0$, --

Column 14,
Line 49, "CY1, CY2" should read -- $C_{Y1}, C_{Y2}$ --

Column 15,
Line 25, "claim 5" should read -- claim 5, --
Line 32, "claim 1" should read -- claim 1, --

Column 16,
Line 1, "claim 11" should read -- claim 11, --
Line 4, "circuit has" should read -- circuits have --
Line 14, "claim 14" should read -- claim 14, --
Line 25, "claim 17" should read -- claim 17, --

UNITED STATES PATENT AND TRADEMARK OFFICE
CERTIFICATE OF CORRECTION

PATENT NO.    : 6,590,302 B2
DATED         : July 8, 2003
INVENTOR(S)   : Goepfrich et al.

It is certified that error appears in the above-identified patent and that said Letters Patent is hereby corrected as shown below:

<u>Column 16 cont'd,</u>
Line 37, "sand" should read -- and --
Line 41, "and further wherein," should read -- and further, wherein --

Signed and Sealed this

Tenth Day of February, 2004

JON W. DUDAS
*Acting Director of the United States Patent and Trademark Office*